United States Patent
Gao et al.

(10) Patent No.: US 7,881,402 B2
(45) Date of Patent: Feb. 1, 2011

(54) COMPENSATION FOR GAIN IMBALANCE, PHASE IMBALANCE AND DC OFFSETS IN A TRANSMITTER

(75) Inventors: Weig Gao, Fremont, CA (US); Didmin Shih, Milpitas, CA (US)

(73) Assignee: VIA Technologies, Inc., Taipei (TW)

( * ) Notice: Subject to any disclaimer, the term of this patent is extended or adjusted under 35 U.S.C. 154(b) by 946 days.

(21) Appl. No.: 11/739,840

(22) Filed: Apr. 25, 2007

(65) Prior Publication Data

US 2008/0063113 A1 Mar. 13, 2008

Related U.S. Application Data

(60) Provisional application No. 60/824,827, filed on Sep. 7, 2006.

(51) Int. Cl.
| H04K 1/02 | (2006.01) |
| H04L 25/03 | (2006.01) |
| H04L 25/49 | (2006.01) |
| H04L 27/00 | (2006.01) |
| H03K 7/00 | (2006.01) |
| G06F 1/04 | (2006.01) |

(52) U.S. Cl. .................. 375/296; 375/295; 332/106; 327/291

(58) Field of Classification Search .................. 375/296
See application file for complete search history.

(56) References Cited

U.S. PATENT DOCUMENTS

| 6,760,577 B2 | 7/2004 | Li |
| 6,771,709 B2 | 8/2004 | Huang et al. |
| 7,010,278 B2 | 3/2006 | Kirschenmann et al. |
| 7,035,341 B2 | 4/2006 | Mohindra |
| 7,039,124 B2 | 5/2006 | Lee |
| 2006/0083335 A1* | 4/2006 | Seendripu et al. ........... 375/332 |
| 2007/0293163 A1* | 12/2007 | Kilpatrick et al. ............. 455/84 |

FOREIGN PATENT DOCUMENTS

CN 1389987 1/2003

OTHER PUBLICATIONS

Marchesani, Rossano. "Digital Precompensation of Imperfections in Quadrature Modulators." IEEE Transactions on Communications. vol. 48, No. 4, Apr. 2000. pp. 552-556.
Cavers, James K. "New Methods for Adaptation of Quadrature Modulators and Demodulators in Amplifier Linearization Circuits." IEEE Transactions on Vehicular Technology, vol. 46, No. 3, Aug. 1997. pp. 707-716.

* cited by examiner

*Primary Examiner*—David C Payne
*Assistant Examiner*—Erin M File
(74) *Attorney, Agent, or Firm*—James W. Huffman (57) ABSTRACT

A method for correcting gain imbalance error, phase imbalance error and DC offset errors in a transmitter having an OFDM-based I/Q modulator is disclosed. The method employs a compensator prior to the I/Q-modulator to compensate for the gain and phase imbalance and DC offset. The compensator is efficiently updated with the estimated values of gain and phase imbalance and DC offsets obtained by performing the DFT operation in the digital baseband domain while sending a pair of orthogonal test tones to the modulator's inputs from a digital baseband chip, then down converting the RF modulated signal through a nonlinear device and a bandpass filter to a baseband signal, and finally sampling it using an A/D. The delay mismatch, which is mainly generated by lowpass filters between the I and Q branches, is also minimized in this method.

20 Claims, 7 Drawing Sheets

COMPENSATION FOR GAIN IMBALANCE, PHASE IMBALANCE AND DC OFFSETS IN A TRANSMITTER

FIELD OF THE INVENTION

The invention relates to a system and method for efficiently compensating for the errors such as gain imbalance, phase imbalance and DC offset in a transmitter having a quadrature modulator.

DESCRIPTION OF THE RELATED ART

In digital communication systems, information to be transmitted in quadrature modulation architecture is generally split into two data sequences using a serial-to-parallel converter. One of the data sequences is provided to an inphase (I) branch and the other is provided to a quadrature (Q) branch. The data sequences on the I and Q branches are then pulse shaped or lowpass filtered to form band-limited baseband signals with spectral efficiency. The I and Q baseband signals separately modulate the phases or amplitudes of a pair of orthogonal carrier signals to realize the spectrum transfer from the baseband domain to the radio frequency (RF) domain to enable effective transmission through an antenna. In more detail, the quadrature modulation involves mixing the I branch and Q branch baseband signals with a pair of orthogonal carrier signals using a pair of mixer circuits and then summing the outputs of the mixer circuits. The carrier signals are nominally orthogonal, i.e., they are supposed to have a 90 degree phase difference.

Gain imbalance, phase imbalance and DC offsets caused by mismatching errors in quadrature based modulators degrade the overall system performance. For example, such errors may cause the overall system to fail to meet the required mask of power spectral density (PSD) of the transmitted signal or the required error vector magnitude (EVM). The gain imbalance is mainly due to the following contributing factors: an imbalance in the amplitudes of the sine and cosine carrier signals; an imbalance in the amplitudes of the I and Q branch baseband signals; and non-identical mixer circuits.

The phase imbalance is the amount by which the carrier signals depart from being purely orthogonal, i.e., their departure from the ideal condition of being 90 degree apart in phase. DC offsets are the offsets on the I and Q baseband braches. DC offsets result in carrier leakage at the final transmitter output. (Carrier leakage is undesirable since it increases power consumption.) It would be of tremendous benefit to the field of telecommunication if there existed a mechanism capable of compensating for errors such as the gain imbalance, phase imbalance and/or DC offsets in a transmitter.

Figure 1:
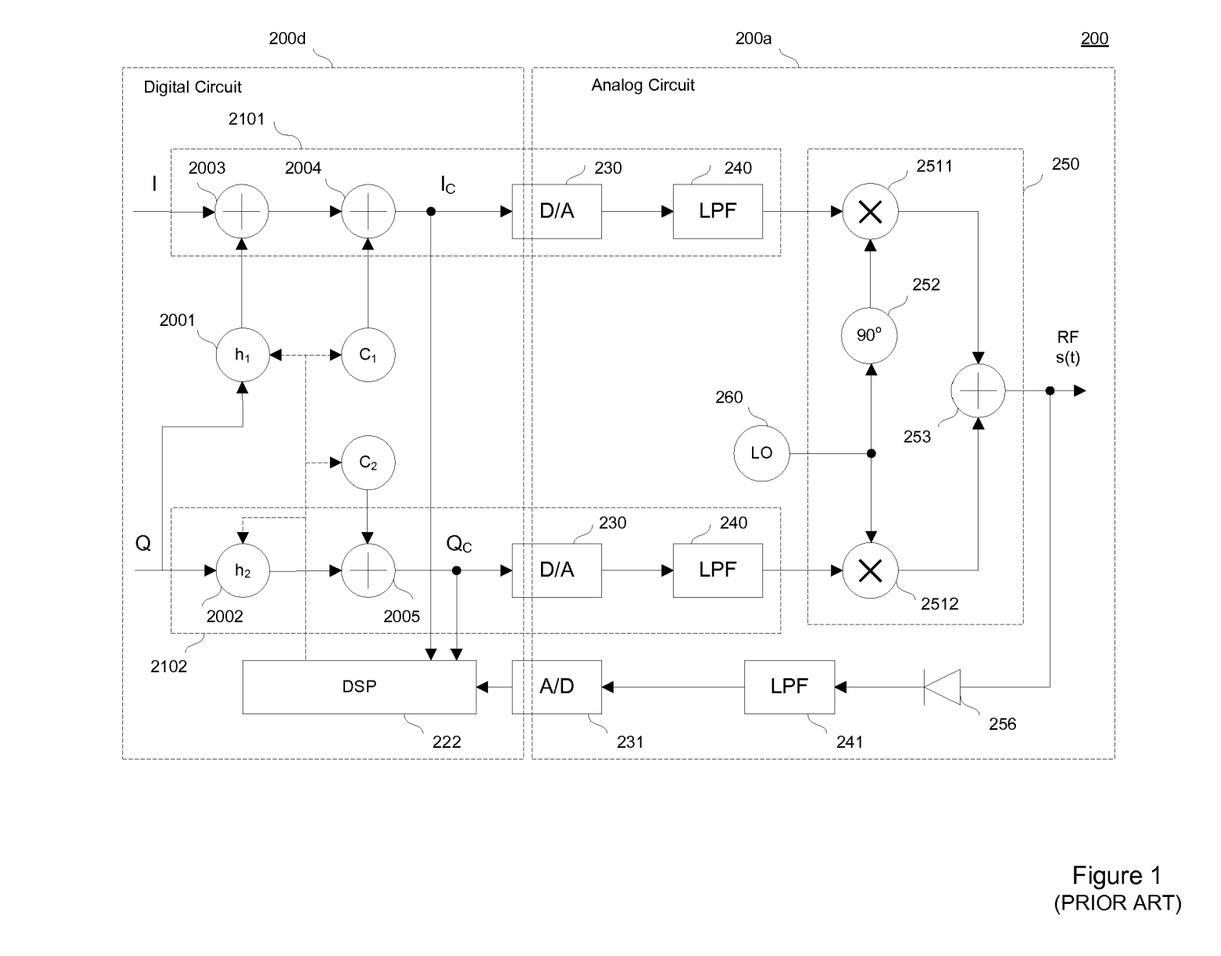
FIG. 1 illustrates a block diagram of a transmitter according to U.S. Pat. No. 6,771,709 invented by Huang et al.

U.S. Pat. No. 6,771,709, issued on Aug. 3, 2004 to Huang et al., describes a system and method for direct transmitter self-calibration. The system, illustrated in FIG. 1, provides a calibration method for determining coefficients of a pre-distortion circuit prior to the I/Q modulator from some measurements and calculations so that the cascaded pre-distortion circuit and the I/Q modulator achieves a maximum local oscillator (LO) suppression and sideband suppression. This system includes a digital pre-distortion circuit $200d$ and an analog baseband and the RF I/Q modulator circuit $200a$. The gain imbalance error $\alpha$ and the DC offset errors $C_I$ and $C_Q$ (contributed in the analog baseband) and the phase imbalance error $\phi$ (contributed in the RF I/Q modulator circuit $200a$) are corrected using the coefficients $h_1$, $h_2$, $C_1$, and $C_2$, where the factors $h_1$ and $h_2$ are defined as $h_1=\tan(\phi)$ and $h_2=1/\alpha\cos(\phi)$. The I-branch and Q-branch signals are modified using these pre-distortion coefficients in the circuit $200d$. The pre-distorted I/Q signals are fed to the RF I/Q modulator $250$ after passing through digital-to-analog (D/A) converter $230$ and lowpass filter (LPF) $240$. At the output of the summer $253$, the RF modulated signal s(t), which bears the influence of the gain and phase imbalance errors and DC offset errors, is fed through a feedback loop including an envelope detector diode $256$, a LPF $241$, an analog-to-digital (A/D) converter $231$ and a digital signal processing (DSP) circuit $222$. The DSP $222$ functions as a parameter estimator to compute the coefficients $h_1$, $h_2$, $C_1$, and $C_2$. The drawback of this technique is that the coefficients require several complicated computational operations such as matrix multiplications and inversion. These operations increase the cost and complexity of the device.

Another method for correcting the gain/phase imbalance is described in U.S. Pat. No. 7,010,278, entitled "Sideband Suppression Method and Apparatus for Quadrature Modulator Using Magnitude Measurements", issued on Mar. 7, 2006 to Kirschenmann et al. This method estimates the gain imbalance by separately measuring the ratio of the magnitudes of the RF modulated signals (a) when applying a DC signal at the I branch input and zero at the Q branch input and (b) when applying zero at the I branch input and a DC signal at the Q branch input. Then, the phase imbalance is estimated by measuring the amplitudes of the RF modulated signals several times when applying different DC input combinations at the I and Q branches and known phase shift values. The disadvantage of this method is that test inaccuracy may cause estimation errors when applying the DC input signals to the I and Q branches. Furthermore, since the method does not provide for DC offset compensation, DC offsets on the I and Q branches cause measurement errors during the amplitude measurements. In order to minimize the effect of DC offsets on the estimations of the gain imbalance and phase imbalance, doubled measurements and calculations are needed. This increases measurement and calculation load, and thus, increases the cost of the calibration.

Marchesani (IEEE Trans. on Communications, Vol. 48, No. 4, April 2000, pp. 552-556) suggests a technique to digitally compensate for imperfections in quadrature modulators. The envelope signal is detected at the modulator output and then sampled through an A/D converter. The expected value of the sampled signal is calculated over a large number of samples. Finally, estimated values of gain/phase imbalance errors and DC errors are obtained at the output of the integration. Even though a simple least-mean-square (LMS) algorithm is used in this technique, the expected values of the desired quantities have to be calculated over a large number of samples to make those terms small enough. Hence, this method is not suitable for frame-based transmission systems.

SUMMARY OF THE INVENTION

In one set of embodiments, a transmitter may include a compensator circuit, a quadrature modulator and a feedback path. The feedback path may be configured to extract an envelope of the RF signal generated by the quadrature modulator and to apply an adjustable time delay to the envelope signal.

In some embodiments, a method of compensating for one or more errors in the transmitter may involve the following operations. (1) An orthogonal pair of tones may be supplied to the compensator circuit. (2) The delay value of a delay unit in the feedback path may be adjusted in order to approximate the condition that a sum of a first phase lag corresponding to the delay value and a second phase lag associated with one or more filters in the transmitter is an integer multiple of π. (3) An update for one or more parameters of the compensator circuit may be generated. The process of generating an update for the one or more parameters may include: capturing a block of samples from the feedback path, computing a complex Fourier transform coefficient corresponding to the frequency $kf_b$ from the block of samples, where $f_b$ is the frequency of the orthogonal pair of test tones, where k is one or two, and computing the update for the one or more parameters using the Fourier transform coefficient. (4) The updated one or more parameters may be supplied to the compensator circuit. The operations (3) and (4) may be repeated a number of times until a termination condition is achieved.

An example of errors that may be compensated for include DC offset errors such as inphase DC offset error and quadrature DC offset error. When compensating for DC offset error(s), k equals one. Another example of errors that may be compensated for includes gain imbalance error and phase imbalance error. When compensating for gain imbalance error and/or phase imbalance error, k equals two.

In some embodiments, the method may be applied to compensate for only one error if desired. For example, it may be known a priori that a certain class of transmitters has negligible gain imbalance error, and thus, the compensation for gain imbalance error need not be performed for that transmitter class.

In one set of embodiments, the transmitter may include a compensator, a pair of digital-to-analog (D/A) conversion units, a quadrature modulator, a feedback circuit and a control unit. The compensator circuit may be configured to receive and operate on a first pair of discrete-time signals in order to generate a second pair of discrete-time signals. The pair of digital-to-analog (D/A) conversion units may be configured to convert the second pair of discrete-time signals respectively into a third pair of analog signals. The quadrature modulator may be configured to operate on the third pair of analog signals in order to generate an output RF signal. The feedback circuit may be configured to detect an envelope signal from the output RF signal and to apply a time delay to the envelope signal in order to generate a feedback signal. The control unit may be configured to adjust an amount of the time delay and to compute and update one or more compensation parameters of the compensator circuit. The compensator circuit may also be configured to operate on the first pair of discrete-time signals so that the second pair of discrete-time signals compensate for one or more errors in the transmitter.

In some embodiments, the compensator circuit may include a 2×2 matrix multiply circuit and a pair of scalar multiplication units. The 2×2 matrix multiply circuit may be configured to perform a matrix multiplication operation on the first pair of discrete-time signals in order to generate an intermediate pair of discrete-time signals. The pair of scalar multiplication units may be configured to multiply the intermediate pair of discrete-time signals respectively by a pair of gain parameter values in order to obtain a pair of scaled discrete-time signals.

In some embodiments, the one or more compensation parameters of the compensator circuit may include a phase imbalance parameter. The compensator may be configured to receive the phase imbalance parameter from the control unit and to determine coefficients of the matrix multiplication operation based on the phase imbalance parameter.

In some embodiments, the compensator circuit may include a pair of DC offset circuits in order to compensate for DC offset errors in the transmitter.

In some embodiments, the transmitter may also include an inverse Fast Fourier Transform (IFFT) unit configured to receive and operate on blocks of coefficients in order to generate the first pair of discrete-time signals. The control unit may be configured to control a selection of the blocks of coefficients from a memory (e.g., a memory internal to the transmitter).

The feedback circuit may include a nonlinear device and a bandpass filter. The nonlinear device may be configured to operate on the output RF signal in order to generate a signal s(t). The bandpass filter may be configured to filter the signal s(t) in order produce the envelope signal.

The feedback circuit may include an adjustable delay unit configured to perform said application of the time delay to the envelope signal. The adjustable delay unit may be configured to receive a control signal, from the control unit, indicating the amount of the time delay.

In some embodiments, the compensator circuit, the pair of D/A conversion units and the control units are fabricated on a first chip, and, the quadrature modulator and the feedback circuit are fabricated on a second chip.

In some embodiments, the transmitter is fabricated on a single chip.

In some embodiments, the control unit may be configured to read and execute program instructions stored in a memory.

In one set of embodiments, a transmitter may include an analog portion and a digital signal processing (DSP) portion. The analog portion includes a quadrature modulator. Unfortunately, the analog portion may have errors associated with its operation, e.g., errors such as phase imbalance error, gain imbalance error and DC offset errors. Thus, the DSP portion may include a compensator configured to compensate for the transmitter errors (or any subset of these errors).

In some embodiments, a method for providing adaptive compensation of the transmitter errors may involve: sending a pair of orthogonal calibration tones from the DSP portion to the I and Q branches of the quadrature modulator; estimating values of one or more of the errors, and then, updating parameters of the compensator using the estimated values. The compensation method may be performed either during a calibration mode, prior to data transmission mode, or, in an idle period without data transmission. The error value estimation and parameter update processes may be repeated until the errors are sufficiently compensated. To accurately and quickly estimate values of the errors, an adaptive algorithm based on the Discrete Fourier Transform (DFT) operation may be employed.

In one embodiment, the analog portion may include low-pass filters and voltage amplifiers in addition to the quadrature modulator. The transmitter may also include a compensator circuit in the DSP portion. The compensator may include subcircuits to compensate for gain imbalance error, phase imbalance error and DC offset errors. In addition, the transmitter may also include: a power detection circuit that is used to perform envelope detection on the RF modulated signal at the output of the modulator; a bandpass filter that is used to attenuate the DC component and high order harmonics of the envelope signal; and an A/D conversion device that is used to convert the analog output of the power detection circuit to a digital signal.

In some embodiments, the transmitter of the present invention provides a low cost and effective on chip correction method based on the DFT and inverse DFT (IDFT) operations for the transmitter errors founded in a transmitter architecture supporting the OFDM signal format, but not limited to the OFDM format. OFDM is an acronym for "orthogonal frequency division multiplexing". Note that DFT and IDFT operations are inherently required in OFDM-based transmitters or transceivers.

BRIEF DESCRIPTION OF THE DRAWINGS

FIG. 2 illustrates one embodiment of a transmitter including a digital baseband circuit 500b and an analog RF circuit 500a.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this specification, the word "may" is used in a permissive sense (i.e., in the sense of "having the potential to"), rather than in the mandatory sense (i.e., in the sense of "must"). Furthermore, the phrase "A includes B" is used to mean "A includes B, but is not limited to B".

DETAILED DESCRIPTION OF THE PREFERRED EMBODIMENTS

Figure 2:
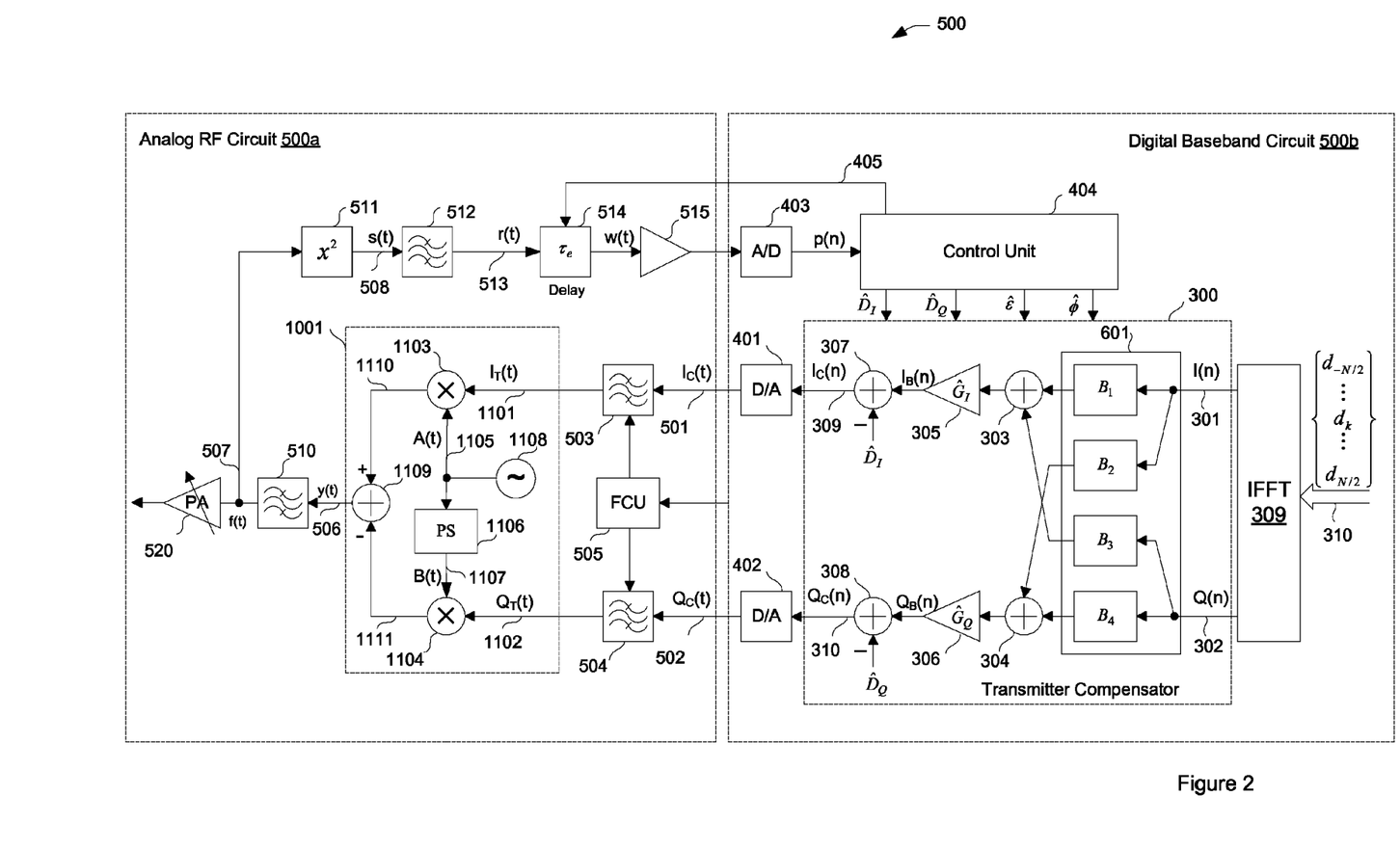

Referring to FIG. 2, a block diagram of a transmitter 500 is depicted. The transmitter 500 may include an analog RF circuit 500a and a digital baseband circuit 500b. A pair of analog baseband input signals 501 and 502, referred to herein as the inphase signal $I_C(t)$ and the quadrature signal $Q_C(t)$, may enter the analog RF circuit 500a from the digital baseband circuit 500b. The inphase signal $I_C(t)$ may be supplied to a lowpass reconstruction filter 503, thereby producing an inphase signal $I_T(t)$ 1101. The inphase signal $I_T(t)$ may be used to modulate an inphase carrier signal $A(t)$ 1105 supplied by local oscillator 1108. This modulation may be achieved by multiplying the inphase signal $I_T(t)$ and the inphase carrier signal $A(t)$ in a first mixer 1103.

Similarly, the quadrature signal $Q_C(t)$ may be supplied to a lowpass reconstruction filter 504, thereby producing a quadrature signal $Q_T(t)$ 1102. The quadrature signal $Q_T(t)$ may be used to modulate a quadrature carrier signal $B(t)$ 1107 supplied by phase shifter (PS) 1106. This modulation may be achieved by multiplying the quadrature signal $Q_T(t)$ and the quadrature carrier $B(t)$ in a second mixer 1104.

The phase shifter 1106 may receive the inphase carrier signal $A(t)$ from the local oscillator 1108. The phase shifter 1106 may be configured to shift the inphase carrier signal nominally by 90 degrees in order to generate the quadrature carrier signal $B(t)$. Because of imperfections in the circuitry of phase shifter 1106, the phase difference between the inphase carrier signal and the quadrature carrier signal may not be exactly equal to 90 degrees. The phase imbalance $\phi$ is defined as the departure of this phase difference from 90 degrees. Without loss of generality, the inphase and quadrature carrier signals may be expressed in a manner that symmetrically distributes the phase imbalance as follows:

$$A(t)=\cos(\omega_C t+\phi/2)=\cos[\omega_C(t+\tau_T/2)]$$

$$B(t)=\sin(\omega_C t-\phi/2)=\sin[\omega_C(t-\tau_T/2)]$$

where $\omega_c$ is the angular frequency of the local oscillator 1108 and t represents time. The parameter $\tau_T$ is the delay mismatch between the carrier signals $A(t)$ and $B(t)$.

The phase-modulated signals 1110 and 1111, generated by the first and second mixers respectively, may be summed using an adder 1109 to form a quadrature-modulated radio frequency (RF) signal expressed as $$y(t)=I_T(t)\cos(\omega_C t+\phi/2)-Q_T(t)\sin(\omega_C t-\phi/2) \qquad (1)$$

The RF signal y(t) 506 may be supplied to a bandpass filter (BPF) 510 which is configured to remove high frequency harmonics. The output f(t) 507 of the BPF 510 may be provided to a power amplifier (PA) 520. The power amplifier 520 amplifies the signal f(t) for transmission onto a channel, e.g., the atmosphere or free space.

One of the characteristic properties of the quadrature modulator 1001 is its sideband suppression (SBS). The digital baseband circuit 500b may facilitate a measurement of SBS by providing a pair of orthogonal tones as the input signals $I_C(t)$ and $Q_C(t)$ to the analog RF circuit 500a. In other words, the digital baseband circuit may provide $$I_C(t)=\cos(\omega_b t)$$

$$Q_C(t)=\sin(\omega_b t)$$

where $\omega_b$ is the radian frequency of the tones. The signals $I_T(t)$ and $Q_T(t)$ at the output of the lowpass filters 503 and 504 may then be expressed as:

$$I_T(t)=G_I I_C(t)+D_I=G_I \cos(\omega_b t)+D_I \qquad (2a)$$

$$Q_T(t)=G_Q Q_C(t)+D_Q=G_Q \sin(\omega_b t)+D_Q \qquad (2b)$$

where $G_I$ represents the I branch gain, $G_Q$ represents the Q branch gain, $D_I$ is the DC offset in the I branch, and $D_Q$ is the DC offset in Q branch.

The gain imbalance $\epsilon$ is defined as $$\varepsilon = \frac{G_I}{G_Q} - 1 \qquad (3)$$

Under the normalization condition of $G_I^2+G_Q^2=2$, the gain amplitudes $G_I$ and $G_Q$ can be expressed as $$G_I = (1+\varepsilon)\sqrt{\frac{2}{2+2\varepsilon+\varepsilon^2}} \approx 1+\frac{\varepsilon}{2} \qquad (4a)$$

$$G_Q = \sqrt{\frac{2}{2+2\varepsilon+\varepsilon^2}} \approx 1-\frac{\varepsilon}{2} \qquad (4b)$$

Figure 3:
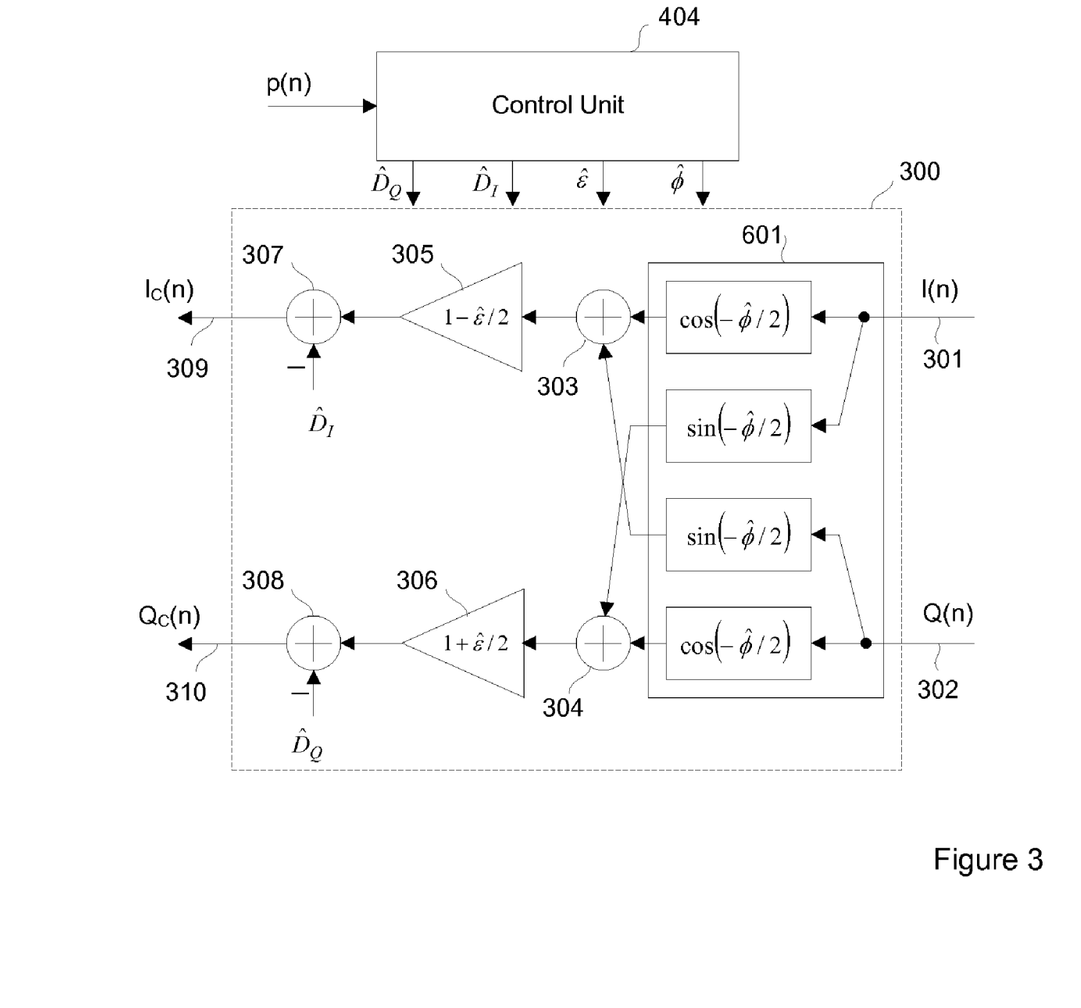
FIG. 3 illustrates one embodiment of compensator circuit 300 and its inputs from control unit 404.

These expressions are derived using the Taylor series approximations to $G_I$ and $G_Q$ under the assumption that $|\varepsilon|\ll 1$. It is not likely that the gain amplitudes $G_I$ and $G_Q$ actually obey the normalization condition, but one can pretend that they do since the pretence does not compromise the ability to achieve compensation using compensator 300 and may result in simpler expression for $G_I$ and $G_Q$ in terms of $\varepsilon$. Note that other normalization conditions may be, i.e., the sum of the squares of $G_I$ and $G_Q$ may be assumed to be equal to some positive constant other than two.

In terms of $\varepsilon$, therefore, equations (2a) and (2b) reduce to:

$$I_T(t) \approx \left(1+\frac{\varepsilon}{2}\right)\cos(\omega_b t) + D_I \qquad (5a)$$

$$Q_T(t) \approx \left(1-\frac{\varepsilon}{2}\right)\sin(\omega_b t) + D_Q \qquad (5b)$$

By applying basic trigonometric identities to expression (1), it follows that $$y(t) = U(t)\cos(\omega_c t) - V(t)\sin(\omega_c t) \qquad (6)$$

where $$U(t) = I_T(t)\cos(\phi/2) + Q_T(t)\sin(\phi/2) \qquad (7a)$$

$$V(t) = I_T(t)\sin(\phi/2) + Q_T(t)\cos(\phi/2) \qquad (7b)$$

Thus, the phase imbalance $\phi$ is equivalently represented in the baseband domain in terms of a matrix transformation on the signal pair ($I_T(t)$, $Q_T(t)$). (Note that this matrix transformation is invertible.) Therefore, the gain imbalance $\varepsilon$, the phase imbalance $\phi$, and the DC offsets $D_I$ and $D_Q$ are all represented in the equivalent baseband signals $U(t)$ and $V(t)$. Various methods for estimating and compensating for these errors are described below.

In order to detect the envelope of the RF signal f(t) 507, the RF signal f(t) may be supplied to a square-law device 511 (or more generally, a nonlinear device). The output of the square-law device 511 may be supplied to a bandpass filter 512. The bandpass filter 512 may include a DC blocking circuit and a lowpass filter. The output r(t) 513 of the bandpass filter may be supplied to a controllable delay unit 514. The controllable delay unit 514 may introduce a delay $\tau_e$ to the signal r(t). Thus, the output w(t) of the controllable delay unit 514 may be expressed as w(t)=r(t−$\tau_e$). The value of the delay $\tau_e$ may be under the control of the control unit 404 through a bus 405. In one embodiment, the bus 405 is a three-wire interface (TWIF). The controllable delay unit may be configured to have a constant gain over a wide frequency range.

The output of the controllable delay unit 514 may be supplied to a buffer amplifier unit 515. The output of the buffer amplifier unit 515 may be supplied to an analog-to-digital (A/D) converter 403. The discrete-time signal p(n) generated by the A/D converter 403 may be supplied to the control unit 404.

The output s(t) 508 of the square-law device 511 is $$s(t) = U^2\cos^2(\omega_c t) + V^2\sin^2(\omega_c t) - 2UV\cos(\omega_c t)\sin(\omega_c t) \qquad (8a)$$

Applying trigonometric identities, it follows that $$s(t) = \frac{1}{2}U^2(1+\cos(2\omega_c t)) + \frac{1}{2}V^2(1-\cos(2\omega_c t)) - UV\sin(2\omega_c t) \qquad (8b)$$

Noting that the terms at frequency $2\omega_c$ will be nullified by the bandpass filter 512, it is convenient to lump all these terms together as the signal Z(t):

$$s(t) = \frac{1}{2}U^2(t) + \frac{1}{2}V^2(t) + Z(t) \qquad (8c)$$

Substituting for U(t) and V(t) using (7a) and (7b) respectively, one obtains:

$$s(t) = \frac{1}{2}\left\{\begin{array}{l}[(1+\varepsilon/2)\cos(\omega_b t)+D_I]\cos(\phi/2)+\\ [(1-\varepsilon/2)\sin(\omega_b t)+D_Q]\sin(\phi/2)\end{array}\right\}^2 + \\ \frac{1}{2}\left\{\begin{array}{l}[(1+\varepsilon/2)\cos(\omega_b t)+D_I]\sin(\phi/2)+\\ [(1-\varepsilon/2)\sin(\omega_b t)+D_Q]\cos(\phi/2)\end{array}\right\}^2 + Z(t) \qquad (8d)$$

The gain imbalance and the phase imbalance of the analog RF circuit 500a may be compensated for by appropriate selection of values of the parameters in the digital baseband circuit 500b. Assume for the sake of discussion that the DC offsets $D_I$ and $D_Q$ are zero. In this case, equation (8d) reduces to:

$$s(t) = \frac{1}{2}\left\{\begin{array}{l}(1+\varepsilon/2)\cos(\omega_b t)\cos(\phi/2)+\\ (1-\varepsilon/2)\sin(\omega_b t)\sin(\phi/2)\end{array}\right\}^2 + \\ \frac{1}{2}\left\{\begin{array}{l}(1+\varepsilon/2)\cos(\omega_b t)\sin(\phi/2)+\\ (1-\varepsilon/2)\sin(\omega_b t)\cos(\phi/2)\end{array}\right\}^2 + Z(t) \\ = \frac{1}{2}\left\{\begin{array}{l}1+\varepsilon^2/4+\varepsilon\cos(2\omega_b t)+\\ (1-\varepsilon^2/4)\sin(\phi)\sin(2\omega_b t)\end{array}\right\} + Z(t) \qquad (9)$$

The bandpass filter 512 operates on the signal s(t) to produce signal r(t). In particular, the bandpass filter 512 blocks the DC component and the signal Z(t). Thus, the signal r(t) conforms to the expression:

$$r(t) \approx g\varepsilon\cos(2\omega_b t) + g\phi\sin(2\omega_b t) \qquad (10)$$

where g is the gain of the envelope detector (including the device 511 and the bandpass filter 512). The factor of ½ from expression (9) has been absorbed into the gain g. The gain imbalance and phase imbalance are assumed to be small, e.g., $|\varepsilon|\ll 1$ and $|\phi|\ll 1$ radian.

Note that the gain imbalance $\varepsilon$ appears in the amplitude of the $\cos(2\omega_b t)$ term of signal r(t), while the phase imbalance $\phi$ appears in the amplitude of the $\sin(2\omega_b t)$ term of signal r(t). Thus, an estimate $\hat{\varepsilon}$ for the gain imbalance and an estimate $\hat{\phi}$ for the phase imbalance may be determined from the following formulas:

$$\hat{\varepsilon} = \frac{2}{g}\text{Re}\{R(2\omega_b)\} \tag{11a}$$

$$\hat{\phi} = -\frac{2}{g}\text{Im}\{R(2\omega_b)\} \tag{11b}$$

where $R(2\omega_b)$ is the Fourier Transform of the signal r(t) evaluated at radian frequency $2\omega_b$, Re{z} denotes the real part of the complex quantity z, and Im{z} denotes the imaginary part of the complex quantity z.

Since the value of the parameter g might not be known (or known precisely), it may be difficult to estimate the exact values of $\varepsilon$ and $\phi$ through a one time calculation based on formulas (11a) and (11b). Thus, it may be convenient to use an iterative process to approach the values of $\varepsilon$ and $\phi$ as follows. Let $\hat{\varepsilon}(k)$ be the current estimate for the gain imbalance $\varepsilon$. Let $\hat{\phi}(k)$ be the current estimate of the phase imbalance $\phi$. The integer variable k is an iteration index for the iterative process. The control unit 404 may provide the current gain imbalance estimate $\hat{\varepsilon}(k)$ to the compensator 300. The compensator 300 may compute values for gain parameters $\hat{G}_I$ and $\hat{G}_Q$ based on the current gain imbalance estimate $\hat{\varepsilon}(k)$. In some embodiments, the compensator may determine the values for the gain parameters based on (or, in accordance with) the following expressions:

$$\hat{G}_I = \frac{1}{1+\hat{\varepsilon}}\sqrt{\frac{2+2\hat{\varepsilon}+\hat{\varepsilon}^2}{2}} \tag{11c}$$

$$\hat{G}_Q = \sqrt{\frac{2+2\hat{\varepsilon}+\hat{\varepsilon}^2}{2}} . \tag{11d}$$

In other embodiments, the compensator 300 may compute the values of the gain parameters according to the simplified relations: $\hat{G}_I = 1 - \hat{\varepsilon}(k)/2$ and $\hat{G}_Q = 1 + \hat{\varepsilon}(k)/2$.

The compensator 300 may include amplifiers 305 and 306 that implement amplification by $\hat{G}_I$ and amplification by $\hat{G}_Q$ respectively.

Furthermore, the control unit 404 may provide the current phase imbalance estimate $\hat{\phi}(k)$ to the compensator so that the compensator 300 may compute values for the transformation parameters $B_1$, $B_2$, $B_3$ and $B_4$ based on the current phase imbalance estimate.

The compensator 300 may include a set of four multipliers that implement multiplication by $B_1$, $B_2$, $B_3$ and $B_4$, respectively. In one embodiment, the compensator 300 may compute the values of the transformation parameters as shown in FIG. 3 according to the relations:

$$B_1 = B_4 = \cos(-\hat{\phi}(n)/2) \tag{12a}$$

$$B_2 = B_3 = \sin(-\hat{\phi}(n)/2). \tag{12b}$$

The control unit 404 may capture a block of N samples of the signal p(n) from the A/D converter 403, perform an N-point Discrete Fourier Transform (DFT) on the block of signal samples to obtain a Fourier spectrum P(j), j=0, 1, 2, ..., N-1, and then, update the gain imbalance estimate and the phase imbalance estimate according to the following expressions:

$$\hat{\varepsilon}(n+1) = \hat{\varepsilon}(n) + \Delta\hat{\varepsilon} \tag{13a}$$

$$\hat{\phi}(n+1) = \hat{\phi}(n) + \Delta\hat{\phi} \tag{13b}$$

where $$\Delta\hat{\varepsilon} = \lambda\text{Re}\left\{P\left(\frac{2\omega_b}{\omega_S}N\right)\right\} \tag{13c}$$

$$\Delta\hat{\phi} = -\lambda\text{Im}\left\{P\left(\frac{2\omega_b}{\omega_S}N\right)\right\} \tag{13d}$$

where stepsize $\lambda$, which controls the convergence speed, is a small positive value, and $\omega_S$ is the radian frequency corresponding to the sample rate of the A/D converter 403. For example, in one set of embodiments, $\lambda$ may be any value in the range from 0.00001 to 0.01.

The integer N may take any in a wide range of values. For example, in one set of embodiments, N may be a value of the form $2^L$ where L is an element of the set {6, 7, 8, 9, 10, 11}. In one particular embodiment, N equals $2^6=64$. Although powers of two may be convenient from the point of view of computational efficiency, the present inventions do not constrain the integer N to be a power of two.

The updated gain imbalance estimate and the updated phase imbalance estimate may be transferred to the compensator 300 and put into force, whereupon the next cycle of the iterative process may begin. The estimates $\hat{\varepsilon}(k)$ and $\hat{\phi}(k)$ eventually converge to $\varepsilon$ and $\phi$ respectively. In some embodiments, the value $\lambda$ may be constant through the whole iterative process. In other embodiments, the value $\lambda$ may vary in the iterative process.

Note that there is a time delay $\tau_d$ due to the filter 512 and due to the reconstruction filters 503 and 504. In addition, the controllable delay unit 514 introduces a delay $\tau_e$. Taking these delays into account, the signal w(t) at the output the controllable delay unit 514 is given by:

$$w(t) \approx r(t - \tau_d - \tau_e) \tag{14a}$$
$$= g\varepsilon\cos\{2\omega_b(t-\tau_d-\tau_e)\} + g\phi\sin\{2\omega_b(t-\tau_d-\tau_e)\}$$
$$\approx g(\varepsilon\cos(\phi_d + \phi_e) - \phi\sin(\phi_d + \phi_e))\cos(2\omega_b t) + \tag{14b}$$
$$g(\varepsilon\sin(\phi_d + \phi_e) + \phi\cos(\phi_d + \phi_e))\sin(2\omega_b t)$$

where the phases $\phi_d = 2\omega_b\tau_d$ and $\phi_e = 2\omega_b\tau_e$. Therefore, the estimation of the parameters $\varepsilon$ and $\phi$ is complicated in the presence of the delays. The gain imbalance $\varepsilon$ now appears in the amplitude of both the $\cos(2\omega_b t)$ term and the $\sin(2\omega_b t)$ term. The phase imbalance does also. To overcome this problem, the delay $\tau_e$ may be selected so as to satisfy (or, at least approximate) the condition:

$$\phi_d + \phi_e = 2\omega_b(\tau_d + \tau_e) = k\pi$$

for k an integer value in the range {0, 1, 2, ..., $K_{MAX}$}, where $K_{MAX}$ is a positive integer. For example, in one embodiment, $K_{MAX}$ equals two. When this condition is satisfied, expression (14b) reduces to:

$$w(t) = g\varepsilon\cos(2\omega_b t) + g\phi\sin(2\omega_b t) \tag{14c}$$

Note that expression (14c) is the same as expression (10).

To obtain the appropriate value for the delay $\tau_e$, the following procedure may be used. First, the control unit 404 may: set $\hat{\phi}=0$, and set the gain imbalance estimate $\hat{\varepsilon}$ to a value whose magnitude (absolute value) is guaranteed to be large relative to the phase imbalance $\phi$. In one set of embodiments, $\hat{\epsilon}$ may be set so that $|\hat{\epsilon}|$ is greater than or equal to 0.6. For example, in one embodiment, $\hat{\epsilon}$ is set equal to 0.8.

Second, the control unit 404 may adjust the delay value $\tau_e$ and repeatedly compute the quantities $\text{Re}\{P[(2\omega_b/\omega_s)N]\}$ and $\text{Im}\{P[(2\omega_b/\omega_s)N]\}$ in order to determine (or estimate) the value of $\tau_e$ that maximizes $|\text{Re}\{P[(2\omega_b/\omega_s)N]\}|$ or minimizes $|\text{Im}\{P[(2\omega_b/\omega_s)N]\}|$. The delay value $\tau_e$ may be adjusted by modifying one or more parameters of the controllable delay unit 514.

The control unit 404 may employ any of a variety of known search procedures to locate this optimizing value of $\tau_e$. For example, in one embodiment, the control unit employs an M-bit binary search algorithm. The binary search algorithm uses a total of M-1 steps. The value of M depends on the desired accuracy of $\tau_e$. For example, in one embodiment, M is equal to 6. Note that other values of M may be used.

Figure 4:
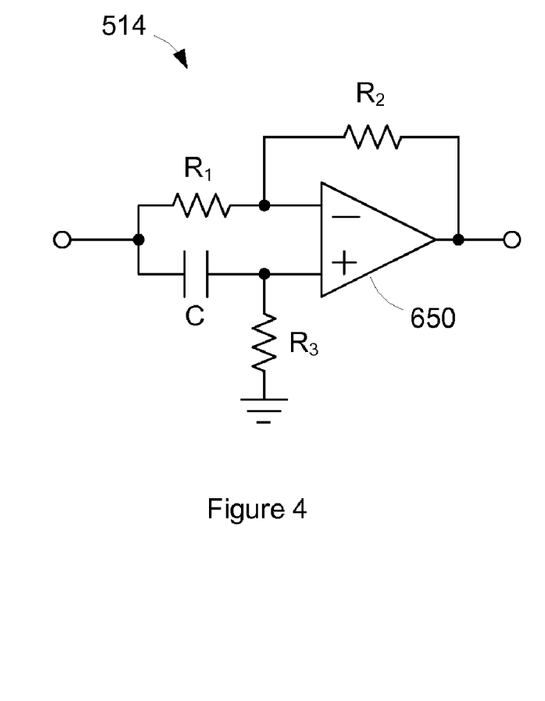
FIG. 4 illustrates one embodiment of controllable delay unit 514.

One embodiment of the controllable delay unit 514 is shown in FIG. 4. The capacitor C may be a switched-capacitance array. The desired capacitance value may be switched through bus 405 (e.g., a three-wire interface) after each decision of the search procedure.

It is apparent from expression (14b) that the optimizing value of $\tau_e$ satisfies (or approximates) the phase condition $\phi_d + \phi_e = k\pi$, which may be equivalently stated as:

$$\sin(\phi_d + \phi_e) = \sin[2\omega_b(\tau_d + \tau_e)] = 0$$

Thus, once the optimizing value of delay $\tau_e$ is determined by maximizing $|\text{Re}\{P[(2\omega_b/\omega_s)N]\}|$, expression (14b) is approximated by expression (14c), which is identical to (10), and the iterative procedure described above based on expressions (13a), (13b), (13c) and (13d) may be used to estimate the phase imbalance and gain imbalance. However, before the iterative procedure is started the gain parameter $\hat{\epsilon}$ and the phase parameter $\hat{\phi}$ of the compensator 300 in FIG. 3 are reset to their initial values of one and zero, respectively.

Figure 5:
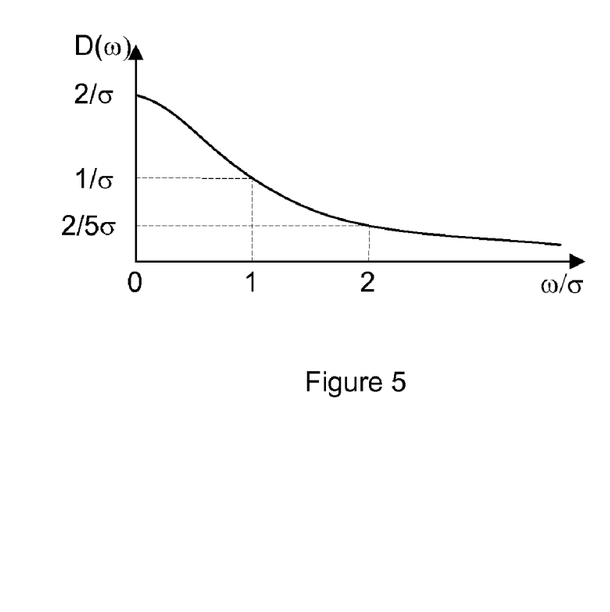
FIG. 5 is a graph of the delay response $D(\omega)$ according to the embodiment of controllable delay unit 514 shown in FIG. 4.

One embodiment of the controllable delay unit 514 is shown in FIG. 4. The controllable delay unit 514 may be a first-order allpass filter having positive unit gain. The controllable delay unit 514 may include three resistors $R_1$, $R_2$ and $R_3$, an operational amplifier 650 and a capacitor C. The capacitance of the capacitor C may be varied in order to adjust the delay $\tau_e$. In one embodiment, the resistors $R_1$, $R_2$ and $R_3$ all share the same value of resistance, i.e., $R_1=R_2=R_3=R$. In this case, the transfer function $T(s)$ of the first-order allpass filter and its delay response $D(\omega)$ may conform to the following expressions:

$$T(s) = \frac{s - \sigma}{s + \sigma} \quad (15)$$

$$D(\omega) = \frac{2/\sigma}{1 + (\omega/\sigma)^2} \quad (16)$$

where s is a complex variable, $\omega$ is radian frequency, and $\sigma = 1/RC$. A graph of the delay response $D(\omega)$ versus the normalized frequency $\omega/\sigma$ is shown in FIG. 5.

In addition, the control unit 404 may compensate for the DC offsets $D_I$ and $D_Q$ of the transmitter by appropriate selection of values for offset parameters $\hat{D}_I$ and $\hat{D}_Q$ as described below. The compensator 300 may include adders 307 and 308 to offset the outputs of amplifiers 305 and 306 respectively. The adder 307 receives the output $I_B(n)$ of the amplifier 305 and the negative of the offset parameter value $\hat{D}_I$. Thus, the output $I_C(n)$ of the adder 307 conforms to the expression $I_C(n) = I_B(n) - \hat{D}_I$. Similarly, the adder 308 receives the output $Q_B(n)$ of the amplifier 306 and the negative of the offset parameter value $\hat{D}_Q$. Thus, the output $Q_C(n)$ of the adder 308 conforms to the expression $Q_C(n) = Q_B(n) - \hat{D}_Q$. The estimated offset values $\hat{D}_I$ and $\hat{D}_Q$ may be stored in corresponding registers internal to the compensator 300.

For the sake of discussion, assume that $\phi = 0$ and $G_I = G_Q = G$ (or $\epsilon = 0$). In this case, signals $U(t)$ and $V(t)$ in expressions (7a)-(7b) may be expressed as:

$$U(t) = \cos(\omega_b t) + D_I$$

$$V(t) = \sin(\omega_b t) + D_Q$$

Thus, expression (8c) for s(t) reduces to:

$$s(t) = \frac{1}{2}(\cos(\omega_b t) + D_I)^2 + \frac{1}{2}(\sin(\omega_b t) + D_Q)^2 + Z(t) \quad (17)$$

Since the bandpass filter 512 removes the DC component and the terms at frequency $2\omega_C$, it follows that:

$$r(t) \approx 2g\{D_I \cos(\omega_b t) + D_Q \sin(\omega_b t)\} \quad (18)$$

Observe that the DC offset $D_I$ appears in the amplitude of the $\cos(\omega_b t)$ term, while the DC offset $D_Q$ appears in the amplitude of the $\sin(\omega_b t)$ term. Thus, estimates for the DC offset $D_I$ and the DC offset $D_Q$ may be obtained from the following formulas:

$$\hat{D}_I = \frac{1}{g}\text{Re}\{R(\omega_b)\} \quad (19a)$$

$$\hat{D}_Q = -\frac{1}{g}\text{Im}\{R(\omega_b)\} \quad (19b)$$

where $R(\omega)$ is the Fourier transform of the signal r(t).

As with the gain imbalance and phase imbalance, the DC offsets $D_I$ and $D_Q$ may be estimated using an iterative process. Let $\hat{D}_I(k)$ denote the current estimate for the DC offset $D_I$. Let $\hat{D}_Q(k)$ denote the current estimate for the DC offset $D_Q$. The control unit 404 may capture a block of N samples of the signal p(n) from the A/D converter 403, perform an N-point DFT on the block of signal samples to obtain a Fourier spectrum P(j), j=0, 1, 2, ..., N-1, and then update the DC offset estimates according to the following expressions:

$$\hat{D}_I(k+1) = \hat{D}_I(k) + \Delta\hat{D}_I \quad (20a)$$

$$\hat{D}_Q(k+1) = \hat{D}_Q(k) + \Delta\hat{D}_Q \quad (20b)$$

where $$\Delta\hat{D}_I = \lambda\text{Re}\left\{P\left(\frac{\omega_b}{\omega_S}N\right)\right\} \quad (21a)$$

$$\Delta\hat{D}_Q = -\lambda\text{Im}\left\{P\left(\frac{\omega_b}{\omega_S}N\right)\right\} \quad (21b)$$

where $\omega_S$ is the radian frequency corresponding to the sample rate of the A/D converter 403.

Similar to the gain imbalance and phase imbalance estimations, the delay $\tau_d$ may also complicate the DC offset estimations. Taking into account both the delay $\tau_d$ and the delay $\tau_e$, the signal w(t) at the output of the controllable delay unit 514 is given by:

$$w(t) \approx 2g \begin{Bmatrix} D_I \cos(\omega_b(t - \tau_d - \tau_e)) + \\ D_Q \sin(\omega_b(t - \tau_d - \tau_e)) \end{Bmatrix} \quad (21c)$$

$$= 2g(D_I \cos(\phi_d + \phi_e) - D_Q \sin(\phi_d + \phi_e))\cos(\omega_b t) + \quad (21d)$$

$$2g(D_I \sin(\phi_d + \phi_e) + D_Q \cos(\phi_d + \phi_e))\sin(\omega_b t)$$

Note that the inphase offset $D_I$ appears in both the amplitude of the $\cos(\omega_b t)$ term and the amplitude of the $\sin(\omega_b t)$ term. The quadrature offset $D_Q$ does also. To overcome this problem, the delay $\tau_e$ may be adjusted until the following phase condition is satisfied (or, at least approximated):

$$\phi_d + \phi_e = \omega_b(\tau_d + \tau_e) = k\pi \quad (21e)$$

for some integer value k in the range $\{0, 1, 2, \ldots, K_{MAX}\}$, where $K_{MAX}$ is a positive integer. In one embodiment, $K_{MAX}$ equals two. When this condition is satisfied, expression (21d) reduces to:

$$w(t) \approx 2g\{D_I \cos(\omega_b t) + D_Q \sin(\omega_b t)\} \quad (21f)$$

Note that the expression (21f) is identical to (18).

To obtain an appropriate value for the delay $\tau_e$, the following procedure may be employed. First, the control unit 404 may intentionally set the DC offset parameters $\hat{D}_I$ and $\hat{D}_Q$ so that the condition $|D_I^{eff}| \gg |D_Q^{eff}|$ is met, where the effective inphase and quadrature offsets are given by:

$$D_I^{eff} = D_I - \hat{D}_I \quad (21g)$$

$$D_Q^{eff} = D_Q - \hat{D}_Q \quad (21h)$$

In one set of embodiments, the quadrature parameter $\hat{D}_Q$ may be set equal to zero, and the inphase parameter $\hat{D}_I$ may be set to be a value greater than or equal to 25 millivolts (mV).

Second, the control unit 404 may set the gain imbalance value $\hat{\epsilon}$ equal to zero and the phase imbalance value $\hat{\phi}$ equal to zero, and transfer these settings to the compensator 300. In response to these settings, the compensator 300 may set the gain parameters $\hat{G}_I$ and $\hat{G}_Q$ equal to one and the transformation parameters $B_1$, $B_2$, $B_3$ and $B_4$ as follows: $B_1=B_4=1$ and $B_2=B_3=0$.

Alternatively, if gain imbalance and phase imbalance estimations have already been performed, the control unit 404 may simply allow the final converged values of the gain imbalance estimate and the phase imbalance estimate to remain in force. In this case, the compensator 300 may continue to use the gain parameter values that were previously determined based on the final converged value of the gain imbalance estimate; and continue to use the transformation parameter values $B_1$, $B_2$, $B_3$ and $B_4$ that were computed based on the final converged value of the phase imbalance estimate.

Third, the control unit 404 may adjust the delay $\tau_e$ and repeatedly compute the quantities $\mathrm{Re}\{P[(\omega_b/\omega_s)N]\}$ and $\mathrm{Im}\{P[(\omega_b/\omega_s)N]\}$ in order to determine the value of $\tau_e$ that maximizes $|\mathrm{Re}\{P[(\omega_b/\omega_s)N]\}|$ and minimizes $|\mathrm{Im}\{P[(\omega_b/\omega_s)N]\}|$. The control unit 404 may employ any of a variety of known search procedures to locate the optimizing value of $\tau_e$. Once the optimizing value of $\tau_e$ is obtained, it may be stored in the control unit 404 for use in the next iteration of the DC offset calibration.

Because the effective inphase offset dominates the effective quadrature offset, the optimizing value of $\tau_e$ satisfies (or comes close to satisfying) the phase condition in (21e). Once the optimizing value of $\tau_e$ is determined, the iterative procedure described above based on expressions (20a), (20b), (21a) and (21b) may be used to estimate the DC offsets $D_I$ and $D_Q$. However, before the iterative procedure is started the offset parameters $\hat{D}_I$ and $\hat{D}_Q$ may be reset to zero.

To show that the compensator 300 really removes the effects of any gain/phase imbalances and DC offsets (after the calibration procedures described herein) at the inputs of the analog RF circuit 500a, the relation between [U(t),V(t)] and [I(n),Q(n)] is derived as follows. Note that the compensator output signals $I_C(n)$ and $Q_C(n)$ are related to the compensator input signals I(n) and Q(n) by the following expression:

$$\begin{bmatrix} I_C(n) \\ Q_C(n) \end{bmatrix} = \begin{bmatrix} \hat{G}_I & 0 \\ 0 & \hat{G}_Q \end{bmatrix} \begin{bmatrix} B_1 & B_3 \\ B_2 & B_4 \end{bmatrix} \begin{bmatrix} I(n) \\ Q(n) \end{bmatrix} - \begin{bmatrix} \hat{D}_I \\ \hat{D}_Q \end{bmatrix} \quad (22)$$

Furthermore, expressions (7a) and (7b) for U(t) and V(t) can be written in matrix as $$\begin{bmatrix} U(t) \\ V(t) \end{bmatrix} = \begin{bmatrix} \cos(\phi/2) & \sin(\phi/2) \\ \sin(\phi/2) & \cos(\phi/2) \end{bmatrix} \begin{bmatrix} I_T(t) \\ Q_T(t) \end{bmatrix} \quad (23a)$$

and expressions (2a) and (2b) for $I_T(t)$ and $Q_T(t)$ can be written in matrix form as:

$$\begin{bmatrix} I_T(t) \\ Q_T(t) \end{bmatrix} = \begin{bmatrix} G_I & 0 \\ 0 & G_Q \end{bmatrix} \begin{bmatrix} I_C(t) \\ Q_C(t) \end{bmatrix} + \begin{bmatrix} D_I \\ D_Q \end{bmatrix} \quad (23b)$$

Substituting expression (23b) into (23a) gives:

$$\begin{bmatrix} U(t) \\ V(t) \end{bmatrix} = \begin{bmatrix} c\left(\frac{\phi}{2}\right) & s\left(\frac{\phi}{2}\right) \\ s\left(\frac{\phi}{2}\right) & c\left(\frac{\phi}{2}\right) \end{bmatrix} \left\{ \begin{bmatrix} G_I & 0 \\ 0 & G_Q \end{bmatrix} \begin{bmatrix} I_C(t) \\ Q_C(t) \end{bmatrix} + \begin{bmatrix} D_I \\ D_Q \end{bmatrix} \right\} \quad (23c)$$

where c(x) represents cos(x) and s(x) represents sin(x).

Substituting expression (22) into expression (23c) and evaluating at time t=nT, where T is the sampling period of the D/A conversion, gives:

$$\begin{bmatrix} U(nT) \\ V(nT) \end{bmatrix} = \begin{bmatrix} c\left(\frac{\phi}{2}\right) & s\left(\frac{\phi}{2}\right) \\ s\left(\frac{\phi}{2}\right) & c\left(\frac{\phi}{2}\right) \end{bmatrix} \left\{ \begin{bmatrix} G_I \hat{G}_I & 0 \\ 0 & G_Q \hat{G}_Q \end{bmatrix} \begin{bmatrix} B_1 & B_3 \\ B_2 & B_4 \end{bmatrix} \begin{bmatrix} I(n) \\ Q(n) \end{bmatrix} - \begin{bmatrix} G_I & 0 \\ 0 & G_Q \end{bmatrix} \begin{bmatrix} \hat{D}_I \\ \hat{D}_Q \end{bmatrix} + \begin{bmatrix} D_I \\ D_Q \end{bmatrix} \right\} \quad (24a)$$

After performing the estimation processes described above, $\hat{\phi} \approx \phi$, $\hat{\epsilon} \approx \epsilon$, $\hat{D}_I \approx D_I$ and $\hat{D}_Q \approx D_Q$. The gain parameters $\hat{G}_I$ and $\hat{G}_Q$ are set so that $G_I \hat{G}_I \approx 1$ and $G_Q \hat{G}_Q \approx 1$. Thus, expression (24a) reduces to:

$$\begin{bmatrix} U(nT) \\ V(nT) \end{bmatrix} \approx \begin{bmatrix} c\left(\frac{\phi}{2}\right) & s\left(\frac{\phi}{2}\right) \\ s\left(\frac{\phi}{2}\right) & c\left(\frac{\phi}{2}\right) \end{bmatrix} \left\{ \begin{bmatrix} B_1 & B_3 \\ B_2 & B_4 \end{bmatrix} \begin{bmatrix} I(n) \\ Q(n) \end{bmatrix} - \begin{bmatrix} G_I \hat{D}_I \\ G_Q \hat{D}_Q \end{bmatrix} + \begin{bmatrix} D_I \\ D_Q \end{bmatrix} \right\}. \quad (24b)$$

Since $D_I \approx G_I \hat{D}_I$ and $D_Q \approx G_Q \hat{D}_Q$, expression (24b) reduces to:

$$\begin{bmatrix} U(nT) \\ V(nT) \end{bmatrix} \approx \begin{bmatrix} c\left(\frac{\phi}{2}\right) & s\left(\frac{\phi}{2}\right) \\ s\left(\frac{\phi}{2}\right) & c\left(\frac{\phi}{2}\right) \end{bmatrix} \begin{bmatrix} c\left(-\frac{\hat{\phi}}{2}\right) & s\left(-\frac{\hat{\phi}}{2}\right) \\ s\left(-\frac{\hat{\phi}}{2}\right) & c\left(-\frac{\hat{\phi}}{2}\right) \end{bmatrix} \begin{bmatrix} I(n) \\ Q(n) \end{bmatrix} \quad (25a)$$

Applying basic trigonometric identities gives:

$$\begin{bmatrix} U(nT) \\ V(nT) \end{bmatrix} \approx \begin{bmatrix} c\left(\frac{\phi+\hat{\phi}}{2}\right) & s\left(\frac{\phi-\hat{\phi}}{2}\right) \\ s\left(\frac{\phi-\hat{\phi}}{2}\right) & c\left(\frac{\phi+\hat{\phi}}{2}\right) \end{bmatrix} \begin{bmatrix} I(n) \\ Q(n) \end{bmatrix} \quad (25b)$$

Because $\hat{\phi} \approx \phi$, expression (25b) reduces to:

$$\begin{bmatrix} U(nT) \\ V(nT) \end{bmatrix} \approx \cos(\phi) \begin{bmatrix} I(n) \\ Q(n) \end{bmatrix} \quad (25c)$$

Thus, after the compensator is configured (by the control unit 404) with the parameter values determined as a result of the estimation processes described above, the equivalent baseband signals U(t) and V(t) at the input of the quadrature modulator 1001, evaluated at time t=nT, are approximately scalar multiples of the digital input signals I(n) and Q(n), respectively, where the scalar multiple is cos(φ). The effects of any gain imbalance, phase imbalance and DC offset errors in the analog RF transmitter 500a will have been compensated for (or, at least significantly compensated for).

Note that if the phase error φ=0 in expressions (7a) and (7b), U(t) and V(t) are approximately equal to $I_T(t)$ and $I_Q(t)$, respectively.

In one set of embodiments, the compensator 300 may be configured to receive the estimates $\hat{D}_I$, $\hat{D}_Q$, $\hat{\epsilon}$ and $\hat{\phi}$ from the control unit 404 and store these estimates in four corresponding internal registers (not shown). In one embodiment, the compensator 300 may be configured to compute the gain parameters $\hat{G}_I$ and $\hat{G}_Q$ based on the expressions:

$\hat{G}_I = 1 - \hat{\epsilon}/2$ $\hat{G}_Q = 1 + \hat{\epsilon}/2$

In some embodiments, the analog RF circuit 500a may include a filter control unit 505, as shown in FIG. 2, configured to adjust the cutoff frequencies of the reconstruction filters 503 and 504 (or, in an alternative embodiment, the cutoff frequency of one of the reconstruction filters) in order to achieve the condition that the cutoff frequency of filter 503 is equal, or approximately equal, to the cutoff frequency of filter 504. The corner frequencies of the reconstruction filters may be adjusted by using a switched capacitor matrix (or switched capacity array) with the aid of a reference clock signal.

In those embodiments where the corner frequency (frequencies) are adjustable, the adjustment(s) is (are) preferably performed before the compensations of the gain imbalance, phase imbalance and the DC offsets in order to minimize errors in those compensations.

The digital baseband circuit 500b (see FIG. 2) may include an Inverse Fast Fourier Transform (IFFT) unit 309 configured to receive blocks of coefficients and to apply an Inverse FFT to each of the blocks in order to generate a complex signal x(n)=I(n)+jQ(n), where j is the square root of −1, where I(n) is the real part of x(n), and where Q(n) is the imaginary part of x(n).

Note that the parameter estimation and compensation processes described above rely on the generation of orthogonal test tones at the signal nodes I(n) and Q(n). Orthogonal test tones may be generated using an orthogonal frequency division multiplexing (OFDM) technique, e.g., a technique such as is described in the IEEE 802.11a/g/n standard or in the WiMedia UWB standard. For example, the complex calibration tone signal in IEEE 802.11a/g/n may be expressed as an inverse Fourier transform of a set of coefficients $d_k$, k=−N/2, ..., −1, 0, 1, ..., N/2, as follows:

$$x(t) = \sum_{k=-N/2}^{N/2} d_k \exp\left(j2\pi k \frac{t}{T_p}\right) \quad (28)$$

In expression (28), N is the total number of subcarriers, $T_p$ is the IFFT period, $d_k$ is the complex data value corresponding to the $k^{th}$ subcarrier, and j is the square root of negative one. (Note that the definition of the term "subcarrier" does not include the DC component corresponding to k=0. Also note that $NT_s = T_p$, or equivalently, $f_S/N = 1/T_p$, where $f_S = 1/T_s$ is the sample rate.) To generate a calibration tone, set $d_L = 1$ for a selected integer value L in the range −N/2<L<N/2 and set $d_k = 0$ for k≠L. Then, expression (28) can be expressed in the discrete-time domain as $x(n) = \exp(j2\pi L n \Delta f)$ (29)

Where $\Delta f = 1/T_p$. Expression (29) implies that $I(n) = \cos(2\pi\Omega n)$ (30a)

$Q(n) = \sin(2\pi\Omega n)$ (30b)

Where $\Omega = L\Delta f$

Figure 6:
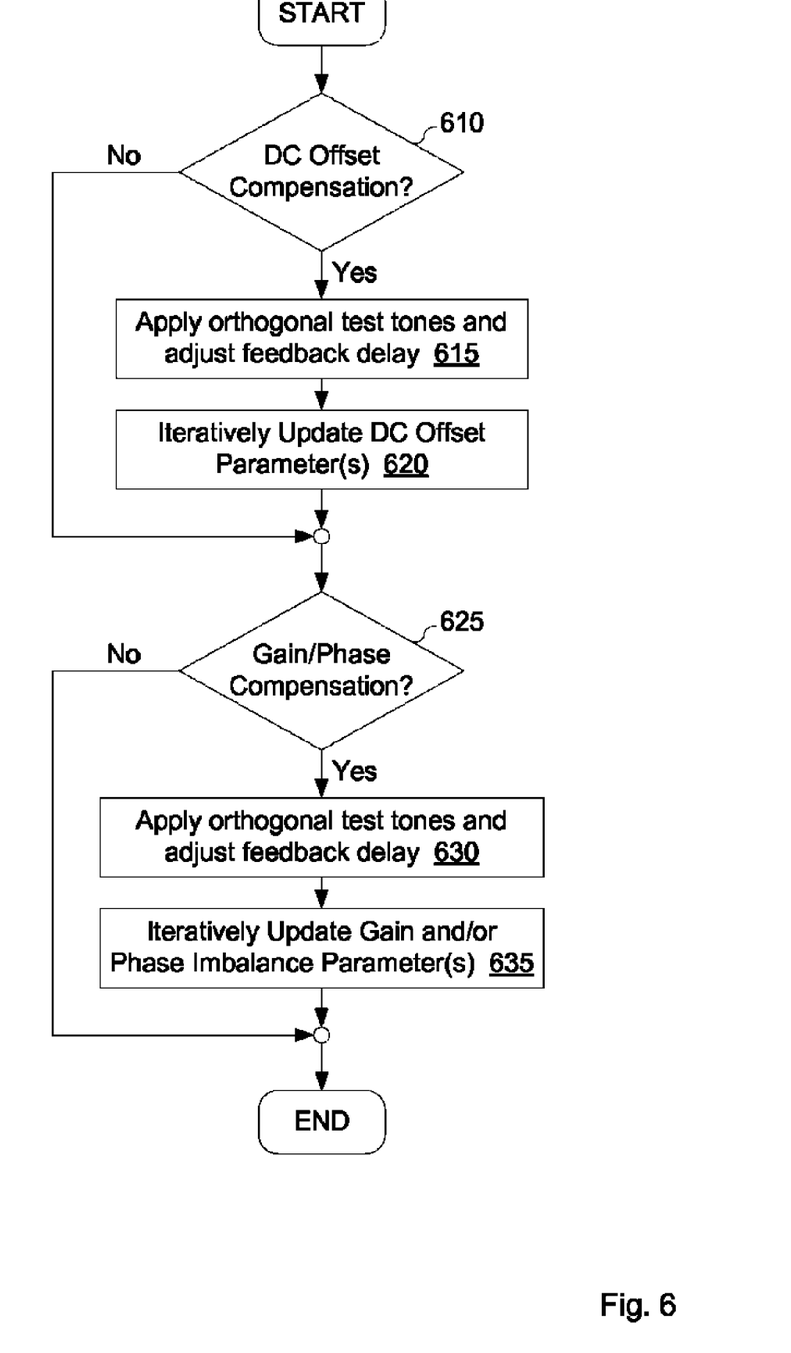
FIG. 6 illustrates one embodiment of a method for compensating for errors in a transmitter (especially in the analog portion of a transmitter).

In one set of embodiments, a method for calibrating a transmitter (e.g., a transmitter such as transmitter 500 of FIG. 2) may be performed as described in FIG. 6. The method may be performed by control unit 404 during a calibration period, prior to operation of the transmitter. The method is described in terms of a collection of "operations" as follows.

In operation 610, the control unit may determine whether at least one of the DC offset compensations has been selected (e.g., by the user, by maintenance personnel, by calibration software running on a host computer, etc.). If at least one of the DC offset compensations has been selected, the control unit may proceed to operation 615. If neither of the DC offset compensations has been selected, the control unit may proceed to operation 625.

In operation 615, the control unit may direct the IFFT unit 309 to generate an orthogonal pair of test tones with angular frequency $\omega_b$, e.g., by controlling the transfer of a pre-selected set of coefficients from memory (e.g., memory internal to the digital baseband circuit 500b or internal to the transmitter 500) to the IFFT unit 309. Furthermore, the control unit may perform a search process to determine the optimizing value of the delay $\tau_e$ (of the adjustable delay unit 514 in FIG. 2) by maximizing $|\text{Re}\{P[(\omega_b/\omega_s)N]\}|$ as described above in the discussion of DC offset compensation, where the optimal $\tau_e$ approximates the condition $$\omega_b(\tau_d + \tau_e) = k\pi$$

for some integer value k.

With the optimizing value of delay $\tau_e$ in force (at the adjustable delay unit 514), the control unit may perform operation 620. In operation 620, the control unit may repeatedly update the DC offset parameters $\hat{D}_I$ and $\hat{D}_Q$ of a compensator (e.g., compensator 300) using the iterative algorithm described above. The control unit may iterate until a termination condition is achieved. For example, the termination condition may be the condition that the iteration count (of iterations already performed) achieves a predetermined number $N_{MAX}$. The number $N_{MAX}$ may be determined at design time. As an alternative, the number $N_{MAX}$ may be specified by a user of the transmitter 500. As another alternative, the number $N_{MAX}$ may be determined by a software program (e.g., a software program executing on a host computer which is coupled to the transmitter 500) and transferred to the control unit 404 prior to transmitter calibration time.

In one embodiment, the number $N_{MAX}$ is a value in the range from 3 to 20 inclusive. In another embodiment, the number $N_{MAX}$ is a value in the range from 5 to 15 inclusive. In yet another embodiment, the number $N_{MAX}$ is a value in the range from 7 to 10 inclusive.

In operation 625, the control unit may determine whether at least one of gain imbalance compensation and phase imbalance compensation has been selected. If at least one of these compensations has been selected, the control unit may proceed with operation 630. If neither of these compensations has been selected, the control unit may terminate processing relative to the method of FIG. 6.

In operation 630, the control unit may direct the IFFT unit 309 to generate an orthogonal pair of test tones with angular frequency $\omega_b$, e.g., by controlling the transfer of a pre-selected set of coefficients from memory to the IFFT unit 309. Furthermore, the control unit may perform a search process to determine the optimizing value of the delay $\tau_e$ (of the adjustable delay unit 514 in FIG. 2) by maximizing $|\text{Re}\{P[2(\omega_b/\omega_s)N]\}|$ as described above in the discussion of gain/phase imbalance compensation, in order to approximate the condition $$2\omega_b(\tau_d + \tau_e) = k\pi$$

for some integer value k.

With the optimizing value of delay $\tau_e$ in force (at the adjustable delay unit 514), the control unit may perform operation 635. In operation 635, the control unit may repeatedly update the value of the gain imbalance parameter $\epsilon$ and/or the value of the phase imbalance parameter $\phi$ in the compensator using the iterative algorithm described above. The control unit may iterate until a termination condition is achieved. Various alternatives are possible for the termination condition, as with operation 620.

In one embodiment, the control unit (or some other agent) may be direct the adjustment of the corner frequency of one or both of the reconstruction filters 503 and 504 so that the corner frequency of filter 503 is at least approximately equal to the corner frequency of the filter 504. This adjustment of the corner frequency (frequencies) may improve the quality of the compensation processes described above.

In one set of embodiments, a transmitter may include a compensator circuit, a quadrature modulator and a feedback path. The compensator circuit operates on input signals to generate modified signals which are supplied to the quadrature modulator. The compensator generates the modified signals in a manner that compensates for errors in the transmitter. The feedback path may be configured to extract an envelope of the RF signal generated by the quadrature modulator and to apply an adjustable time delay to the envelope signal.

Figure 7:
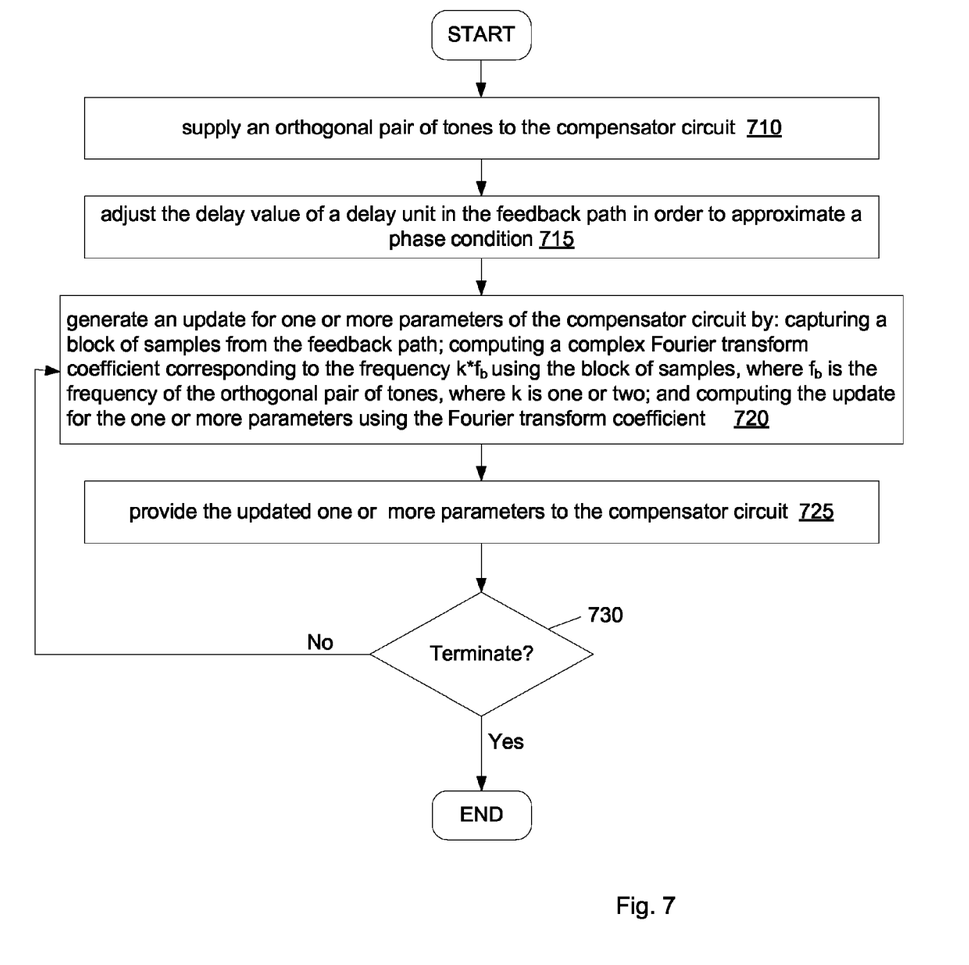
FIG. 7 illustrates one embodiment of a method of compensating for one or more errors associated with a transmitter (especially the analog portion of a transmitter).

In some embodiments, a method of compensating for one or more errors in the transmitter may involve the following operations as illustrated in FIG. 7.

At 710, an orthogonal pair of tones may be supplied to the compensator circuit, e.g., as described above using an inverse Discrete Fourier Transform (DFT).

At 715, the delay value of a delay unit in the feedback path may be adjusted in order to approximate the condition that a sum of a first phase lag corresponding to the delay value and a second phase lag associated with one or more filters in the transmitter is a multiple of $2\pi$. The adjustment may be performed (e.g., as described above) using measurements of the real and imaginary parts of the signal provided by the feedback path. The second phase lag may be the sum of phase lags associated with filters in the circuit path between the input $I_C(n)$ or $Q_C(n)$ and the feedback signal w(t). For example, the second phase lag may be sum of the phase lag associated with the reconstruction filter 503 (or reconstruction filter 504) and the phase lag associated with bandpass filter 512.

At 720, an update for one or more parameters of the compensator circuit may be generated, e.g., as variously described above. The process of generating an update for the one or more parameters may include: capturing a block of samples from the feedback path, computing a transform coefficient corresponding to the frequency $kf_b$ from the block of samples, where $f_b$ is the frequency of the orthogonal pair of tones, where k is one or two, and computing the update for the one or more parameters using the transform coefficient.

At 725, the updated one or more parameters may be supplied to the compensator circuit.

The operations 720 and 725 may be repeated a number of times until a termination condition is achieved. This repetition is suggested in FIG. 7 by the conditional test 730.

The process 715 of adjusting the delay value may include: 1) capturing samples from the feedback path; 2) computing the transform coefficient corresponding to the frequency $kf_b$ from the captured samples; 3) adjusting the delay value of the delay unit; and 4) repeating (1) through (3) in order to maximize the real part of the transform coefficient. Alternatively, 4) may involve repeating (1) through (3) in order to minimize the imaginary part of the transform coefficient.

An example of errors that may be compensated for include DC offset errors such as inphase DC offset error and quadrature DC offset error in the transmitter. When compensating for DC offset error(s), k equals one. Prior to process 715, a quadrature DC offset parameter of the compensator circuit may be set equal to zero and an inphase DC offset parameter of the compensator circuit may be set equal to a nonzero value.

Another example of errors that may be compensated for includes gain imbalance error and phase imbalance error. When compensating for gain imbalance error and/or phase imbalance error, k equals two. Prior to process 715, a phase imbalance parameter of the compensator may be set equal to zero and a gain imbalance parameter of the compensator may be set equal to a nonzero value.

In some embodiments, the method may be applied to compensate for only one error if desired. For example, it may be known a priori that a certain class of transmitters has negligible gain imbalance error, and thus, the compensation for gain imbalance error need not be performed for that transmitter class.

In some embodiment, the termination condition is the condition that the count of complete repetitions of 720 and 725 has reached a predetermined maximum value.

In some embodiments, the process of computing the update for the one or more parameters may include: 1) computing an increment for one of the one or more parameters based on the real part of the transform coefficient, and 2) adding the increment to a previous value of the one parameter.

In some embodiments, the process of computing the update for the one or more parameters may include: 1) computing an increment for one of the one or more parameters based on the imaginary part of the transform coefficient, and 2) adding the increment to a previous value of the one parameter.

Figure 8:
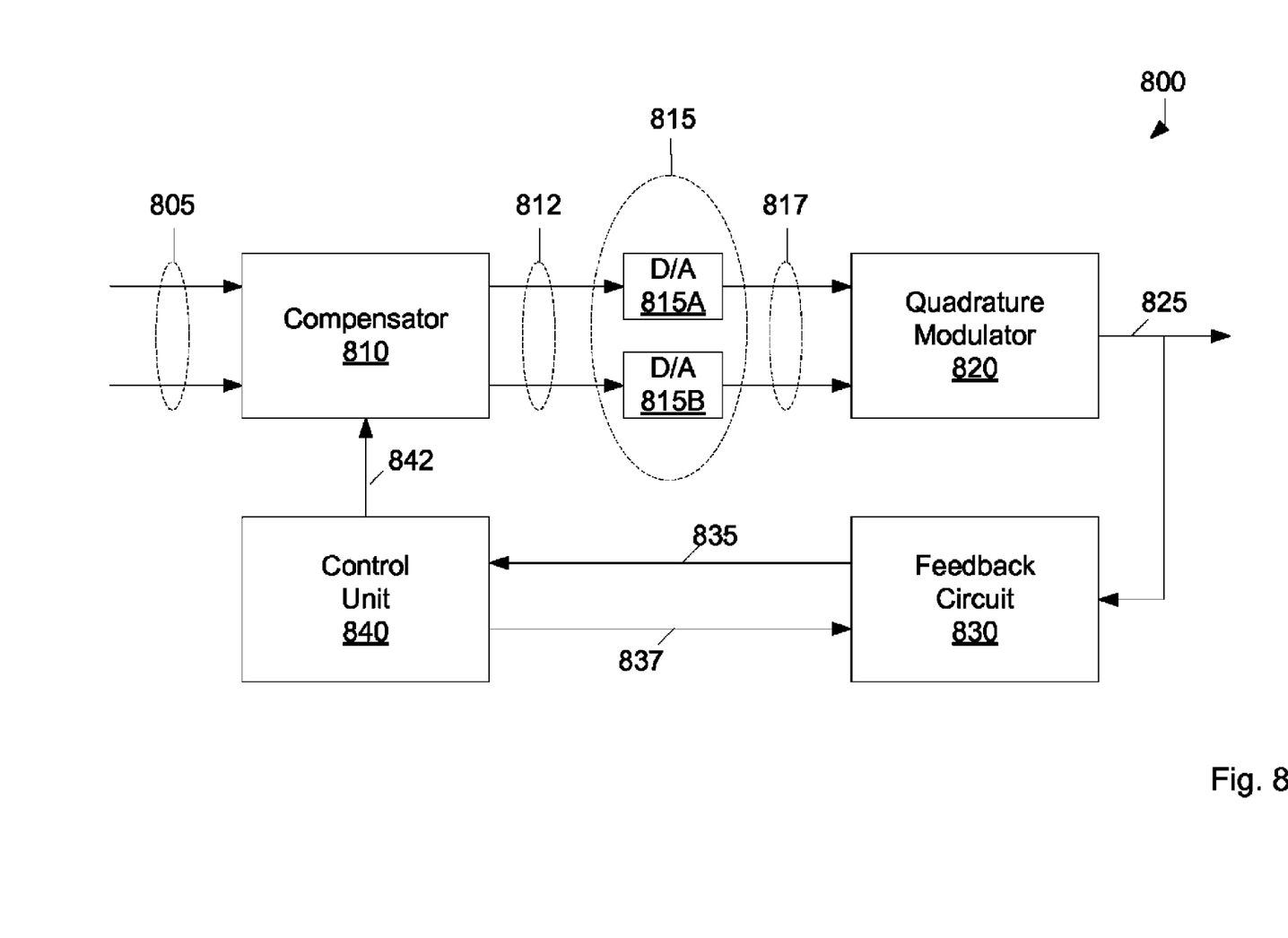
FIG. 8 illustrates a transmitter including a compensator, a quadrature modulator, a feedback circuit and a control unit, where the transmitter is configured to compensator for errors associated with the transmitter (especially the analog portion of the transmitter).

In one set of embodiments, the transmitter 800 may include a number of circuit units, e.g., as illustrated in FIG. 8. The transmitter 800 may include a compensator 810, a pair 815 of digital-to-analog (D/A) conversion units, a quadrature modulator 820, a feedback circuit 830 and a control unit 840. The compensator circuit 810 may be configured to receive and operate on a first pair 805 of discrete-time signals in order to generate a second pair 812 of discrete-time signals. The pair 815 of D/A conversion units may be configured to convert the second pair 812 of discrete-time signals respectively into a third pair 817 of analog signals. The quadrature modulator 820 may be configured to operate on the third pair 817 of analog signals in order to generate an output RF signal 825. The feedback circuit 830 may be configured to detect an envelope signal from the output RF signal and to apply a time delay to the envelope signal in order to generate a feedback signal 835, e.g., as shown in FIG. 2. The control unit 840 may be configured to receive the feedback signal 835, to adjust the amount of the time delay, and to compute and update one or more compensation parameters of the compensator circuit based on captured samples (or blocks of samples) of the feedback signal.

Bus 842 may be used to transfer the updated compensation parameter(s) to the compensation circuit 810.

The compensator circuit 810 may also be configured to operate on the first pair 805 of discrete-time signals so that the second pair 812 of discrete-time signals compensate for one or more errors in the transmitter.

In some embodiments, the compensator circuit 810 may include a 2×2 matrix multiply circuit and a pair of scalar multiplication units. The 2×2 matrix multiply circuit may be configured to perform a matrix multiplication operation on the first pair 805 of discrete-time signals in order to generate an intermediate pair of discrete-time signals. The pair of scalar multiplication units may be configured to multiply the intermediate pair of discrete-time signals respectively by a pair of gain parameter values in order to obtain a pair of scaled discrete-time signals. One example of a 2×2 matrix multiply circuit is illustrated by the adders 303 and 304 and the set 601 of four multipliers in FIG. 2. One example of the pair of scalar multiplication units is illustrated by the multipliers 305 and 306 of FIG. 2.

In some embodiments, the one or more compensation parameters of the compensator circuit 810 may include a phase imbalance parameter $\hat{\phi}$. The compensator circuit may be configured to receive the phase imbalance parameter from the control unit (e.g., via bus 842) and to determine coefficients of the matrix multiplication operation based on the phase imbalance parameter.

In some embodiments, the one or more compensation parameters of the compensator circuit 810 may include a gain imbalance parameter $\hat{\epsilon}$. The compensator circuit 810 may be configured to receive the gain imbalance parameter $\hat{\epsilon}$ from the control unit (e.g., via bus 842) and to determine an inphase DC offset parameter $\hat{D}_I$ and a quadrature DC offset parameter $\hat{D}_Q$ from the gain imbalance parameter. These DC offset parameters may be used to control a pair of DC offset circuits in order to compensate for DC offset errors in the transmitter. One example of the pair of DC offset circuits is illustrated by adders 307 and 308 in FIG. 2.

In some embodiments, the compensator circuit 810 may be configured to compensate both for phase imbalance error and gain imbalance error. Thus, the one or more compensation parameters of the compensator circuit 810 may include a phase imbalance parameter $\hat{\phi}$ and a gain imbalance parameter $\hat{\epsilon}$.

In some embodiments, the control unit 840 may be configured to compute the inphase DC offset parameter and the quadrature DC offset parameter, and provide these parameters to the compensation circuit 810 (instead of providing the gain imbalance parameter $\hat{\epsilon}$).

In some embodiments, the transmitter may also include an inverse Fast Fourier Transform (IFFT) unit configured to receive and operate on blocks of coefficients in order to generate the first pair of discrete-time signals. The control unit 840 may be configured to control a selection of the blocks of coefficients from a memory (e.g., a memory internal to the transmitter).

The feedback circuit 830 may include a nonlinear device and a bandpass filter, e.g., as illustrated in FIG. 2. The nonlinear device may be configured to operate on the output RF signal in order to generate a signal s(t). The bandpass filter may be configured to filter the signal s(t) in order produce the envelope signal r(t). The feedback circuit 830 may also include an adjustable delay unit configured to perform said application of the time delay to the envelope signal, e.g., as illustrated in FIG. 4. The adjustable delay unit may be configured to receive a control signal 837, from the control unit, indicating the amount of the time delay, e.g., as illustrated in FIG. 2.

In some embodiments, the compensator circuit 810, the pair 815 of D/A conversion units and the control unit 840 are fabricated on a first chip, and, the quadrature modulator 820 and the feedback circuit 830 are fabricated on a second chip. The first chip may also include an analog-to-digital (A/D) conversion unit to capture samples of the feedback signal 835.

In some embodiments, the control unit may be configured to read and execute program instructions stored in a memory. The program instructions may include a program module (or set of program modules) for performing the FFT operation. Note that transceiver chips are quite often designed with the capability to perform the FFT operation.

Various embodiments of the present invention provide the ability to adaptively compensate for any subset of the following errors associated with a transmitter: the gain imbalance error, the phase imbalance error, the inphase DC offset error, and the quadrature DC offset error.

Any of the various method embodiments disclosed herein (or any combinations thereof or portions thereof) may be implemented in terms of program instructions. The program instructions may be stored in (or on) any of various memory media. A memory medium is a medium configured for the storage of information. Examples of memory media include various kinds of magnetic media (e.g., magnetic tape or magnetic disk); various kinds of optical media (e.g., CD-ROM);

various kinds of semiconductor RAM and ROM; various media based on the storage of electrical charge or other physical quantities; etc.

Furthermore, various embodiments of a system including a memory and a processor are contemplated, where the memory is configured to store program instructions and the processor is configured to read and execute the program instructions from the memory. In various embodiments, the program instructions encode corresponding ones of the method embodiments described herein (or combinations thereof or portions thereof). For example, the control unit 404 of FIG. 2, or the control unit 840 of FIG. 8, may be a processor configured to execute program instructions stored in a memory (e.g., a memory internal to the transmitter 500 or internal to the digital baseband circuit 500b).

Various embodiments may further include receiving, sending or storing program instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented on programmable hardware, custom designed circuitry, or a combination thereof.

In FIG. 6, DC offset compensations are illustrated as being performed prior to the gain/phase imbalance compensations. In one alternative embodiment, the order is reversed, i.e., the gain/phase imbalance compensations are performed before DC offset compensations.

The invention claimed is:

1. A method of compensating for one or more errors in a transmitter, wherein the transmitter includes a compensator circuit, a quadrature modulator and a feedback path, the method comprising:
    (a) supplying an orthogonal pair of tones as calibration signals to the compensator circuit;
    (b) adjusting a delay value of a delay unit in the feedback path in order to approximate the condition that a sum of a first phase lag corresponding to the delay value plus a second phase lag associated with one or more filters in the transmitter is an integer multiple of $\pi$;
    (c) generating an update for one or more parameters of the compensator circuit, wherein said generating includes:
        capturing a block of samples from the feedback path;
        computing real and imaginary parts of the complex Fourier transform corresponding to the frequency $kf_b$ from the block of samples, wherein $f_b$ is the frequency of the orthogonal pair of tones, wherein k is one or two; and
        computing the update for the one or more parameters using said real and imaginary parts of the complex Fourier transform corresponding to frequency $kf_b$;
    (d) supplying the updated one or more parameters to the compensator circuit; and
    (e) repeating (c) and (d) a number of times until a termination condition is achieved.

2. The method of claim 1, wherein the one or more errors include an inphase DC offset error and a quadrature DC offset error of the transmitter, wherein k equals 1.

3. The method of claim 2 further comprising:
    prior to (b), setting a quadrature DC offset parameter of the compensator circuit equal to zero and setting an inphase DC offset parameter of the compensator equal to a nonzero value.

4. The method of claim 2, wherein said adjusting the delay value includes:
    (b1) capturing samples from the feedback path;
    (b2) computing said real and imaginary parts of the complex Fourier transform corresponding to the frequency $f_b$ from the captured samples;
    (b3) adjusting the delay value of the delay unit; and
    (b4) repeating (b1) through (b3) in order to maximize said real part of the complex Fourier transform corresponding to the frequency $f_b$.

5. The method of claim 1, wherein the one or more errors include a phase imbalance error and a gain imbalance error, wherein k equals 2.

6. The method of claim 5 further comprising:
    prior to (b), setting a phase imbalance parameter of the compensator equal to zero and setting a gain imbalance parameter of the compensator equal to a nonzero value.

7. The method of claim 5, wherein said adjusting the delay value includes:
    (b1) capturing samples from the feedback path;
    (b2) computing said real and imaginary parts of the complex Fourier transform corresponding to the frequency $2f_b$ from the captured samples;
    (b3) adjusting the delay value of the delay unit; and
    (b4) repeating (b1) through (b3) in order to maximize the real part of the complex Fourier transform.

8. The method of claim 1, wherein said termination condition is a condition that a count of completed repetitions of (c) and (d) is greater than or equal to a predetermined maximum value.

9. The method of claim 1, wherein said computing the update for the one or more parameters includes: computing a first increment for a first of the one or more parameters based on said real part of the complex Fourier transform corresponding to the frequency $kf_b$, and adding the first increment to a previous value of the first parameter.

10. The method of claim 1, wherein said computing the update for the one or more parameters includes: computing a second increment for a second of the one or more parameters based on said imaginary part of the complex Fourier transform corresponding to the frequency $kf_b$, and adding the second increment to a previous value of the second parameter.

11. A transmitter system comprising:
    a quadrature modulator;
    a compensator circuit configured to compensate for one or more errors in the quadrature modulator;
    a feedback path; and
    a control unit, wherein the control unit is configured to:
    (a) direct an orthogonal pair of tones to be supplied as calibration signals to the compensator circuit;
    (b) adjust a delay value of a delay unit in the feedback path in order to approximate the condition that a sum of a first phase lag corresponding to the delay value plus a second phase lag associated with one or more filters in the transmitter system is an integer multiple of $\pi$;
    (c) generate an update for one or more parameters of the compensator circuit, wherein said generating includes:
        capturing a block of samples from the feedback path;
        computing real and imaginary parts of the complex Fourier transform corresponding to the frequency $kf_b$ from the block of samples, wherein $f_b$ is the frequency of the orthogonal pair of tones, wherein k is one or two; and computing the update for the one or more parameters using said real and imaginary parts of the complex Fourier transform corresponding to frequency $kf_b$;

(d) supply the updated one or more parameters to the compensator circuit; and (e) repeat (c) and (d) a number of times until a termination condition is achieved.

12. The transmitter system of claim 11, wherein the one or more errors include an inphase DC offset error and a quadrature DC offset error of the transmitter, wherein k equals 1.

13. The transmitter system of claim 12, wherein the control unit is further configured to:

prior to (b), setting a quadrature DC offset parameter of the compensator circuit equal to zero and setting an inphase DC offset parameter of the compensator equal to a nonzero value.

14. The transmitter system of claim 12, wherein said adjusting the delay value includes:

(b1) capturing samples from the feedback path;

(b2) computing said real and imaginary parts of the complex Fourier transform corresponding to the frequency $f_b$ from the captured samples;

(b3) adjusting the delay value of the delay unit; and (b4) repeating (b1) through (b3) in order to maximize said real part of the complex Fourier transform corresponding to the frequency $f_b$.

15. The transmitter system of claim 11, wherein the one or more errors include a phase imbalance error and a gain imbalance error, wherein k equals 2.

16. The transmitter system of claim 15, wherein the control unit is further configured to:

prior to (b), setting a phase imbalance parameter of the compensator equal to zero and setting a gain imbalance parameter of the compensator equal to a nonzero value.

17. The transmitter system of claim 15, wherein said adjusting the delay value includes:

(b1) capturing samples from the feedback path;

(b2) computing said real and imaginary parts of the complex Fourier transform corresponding to the frequency $2f_b$ from the captured samples;

(b3) adjusting the delay value of the delay unit; and (b4) repeating (b1) through (b3) in order to maximize the real part of the complex Fourier transform.

18. The transmitter system of claim 11, wherein said computing the update for the one or more parameters includes: computing a first increment for a first of the one or more parameters based on said real part of the complex Fourier transform corresponding to the frequency $kf_b$, and adding the first increment to a previous value of the first parameter.

19. The transmitter system of claim 11, wherein said computing the update for the one or more parameters includes:

computing a second increment for a second of the one or more parameters based on said imaginary part of the complex Fourier transform corresponding to the frequency $kf_b$, and adding the second increment to a previous value of the second parameter.

20. A computer-readable memory medium storing program instructions, wherein the program instructions, when executed by a computer system, cause the computer system to perform a method of compensating for one or more errors in a transmitter, wherein the transmitter includes a compensator circuit, a quadrature modulator and a feedback path, wherein the method comprises:

(a) supplying an orthogonal pair of tones as calibration signals to the compensator circuit;

(b) adjusting a delay value of a delay unit in the feedback path in order to approximate the condition that a sum of a first phase lag corresponding to the delay value plus a second phase lag associated with one or more filters in the transmitter is an integer multiple of $\pi$;

(c) generating an update for one or more parameters of the compensator circuit, wherein said generating includes:

capturing a block of samples from the feedback path;

computing real and imaginary parts of the complex Fourier transform corresponding to the frequency $kf_b$ from the block of samples, wherein $f_b$ is the frequency of the orthogonal pair of tones, wherein k is one or two; and computing the update for the one or more parameters using said real and imaginary parts of the complex Fourier transform corresponding to frequency $kf_b$;

(d) supplying the updated one or more parameters to the compensator circuit; and (e) repeating (c) and (d) a number of times until a termination condition is achieved.

* * * * *